United States Patent
Lee et al.

(10) Patent No.: US 10,541,982 B1
(45) Date of Patent: Jan. 21, 2020

(54) TECHNIQUES FOR PROTECTING ELECTRONIC DATA

(71) Applicant: JPMorgan Chase Bank, N.A., New York, NY (US)

(72) Inventors: Felix C. P. Lee, North Point (HK); Jacky C. T. Chan, Ho Man Tin (HK); Lydia L. C. Wong, Mid-levels (HK)

(73) Assignee: JPMORGAN CHASE BANK, N.A., New York, NY (US)

( * ) Notice: Subject to any disclaimer, the term of this patent is extended or adjusted under 35 U.S.C. 154(b) by 234 days.

(21) Appl. No.: 15/612,129

(22) Filed: Jun. 2, 2017

Related U.S. Application Data

(60) Provisional application No. 62/344,724, filed on Jun. 2, 2016.

(51) Int. Cl.
*H04L 29/06* (2006.01)
*H04L 29/08* (2006.01)

(52) U.S. Cl.
CPC .......... *H04L 63/0428* (2013.01); *H04L 63/04* (2013.01); *H04L 67/1097* (2013.01)

(58) Field of Classification Search
CPC ............................ H04L 63/0428; H04L 63/04
See application file for complete search history.

(56) References Cited

U.S. PATENT DOCUMENTS

| | | | |
|---|---|---|---|
| 8,458,487 B1 * | 6/2013 | Palgon | G06F 21/00 380/277 |
| 9,613,227 B1 * | 4/2017 | Kothari | G06F 21/6254 |
| 2012/0210139 A2 * | 8/2012 | Taskaya | H04L 63/0428 713/189 |
| 2013/0144901 A1 * | 6/2013 | Ho | G06F 16/248 707/769 |
| 2014/0019586 A1 * | 1/2014 | Saxena | H04L 67/10 709/217 |
| 2014/0123303 A1 * | 5/2014 | Shukla | G06F 21/6254 726/26 |
| 2016/0092486 A1 * | 3/2016 | Mattsson | G06F 16/23 707/756 |

(Continued)

OTHER PUBLICATIONS

Wikipedia contributors. (Jan. 14, 2016). Tokenization (data security). In Wikipedia, The Free Encyclopedia. Retrieved 15:37, Mar. 26, 2019, from https://en.wikipedia.org/w/index.php?title=Tokenization_(data_security)&oldid=699852260 (Year: 2016).*

(Continued)

*Primary Examiner* — Robert B Leung
(74) *Attorney, Agent, or Firm* — Greenblum & Bernstein, P.L.C.

(57) ABSTRACT

Embodiments of the present invention provides a data protection solution which can efficiently tokenize sensitive data submitted by a user device to a public cloud and de-tokenize any tokenized response from the cloud. A small, in-memory token map may be looked up to facilitate the two-way conversions between sensitive data and tokenized data. The token map can be flexibly configured, it may be generated and/or changed on the fly, and its design could preserve data format and provide multilingual support. The innovative tokenization process is fast, secure, scalable through cloud-native design but less costly as compared to prior approaches.

20 Claims, 6 Drawing Sheets

(56) References Cited

U.S. PATENT DOCUMENTS

| | | | |
|---|---|---|---|
| 2017/0004124 A1* | 1/2017 | Kyre | G06F 17/245 |
| 2017/0132420 A1* | 5/2017 | Shetty | G06F 21/602 |
| 2017/0339111 A1* | 11/2017 | Balabine | G06F 21/602 |
| 2018/0276393 A1* | 9/2018 | Allen | G06F 17/241 |

OTHER PUBLICATIONS

HumanGeo. (Jan. 7, 2015). String Tokenization. Retrieved Apr. 1, 2019, from http://blog.thehumangeo.com/2015/01/07/string-tokenization/ (Year: 2015).*

* cited by examiner

| | | Character Position | | | | |
|---|---|---|---|---|---|---|
| | | 1 | 2 | 3 | 4 | EOL |
| Vowel / Lower | | a→i | a→o | a→e | ... | a→y |
| | | e→u | e→a | e→y | ... | e→a |
| | | i→a | i→u | i→a | ... | i→e |
| | | ... | ... | ... | ... | ... |
| Vowel / Upper | | Y→O | Y→e | Y→i | ... | Y→o |
| | | A→O | A→U | A→Y | ... | A→I |
| | | E→U | E→Y | E→A | ... | E→O |
| | | ... | ... | ... | ... | ... |
| Consonant / Lower | | U→A | U→O | U→E | ... | U→Y |
| | | Y→I | Y→J | Y→U | ... | Y→A |
| | | b→g | b→t | b→d | ... | b→d |
| | | c→g | c→l | c→t | ... | c→t |
| | | d→k | d→x | d→m | ... | d→m |
| | | ... | ... | ... | ... | ... |
| Consonant / Upper | | x→c | x→z | x→b | ... | x→l |
| | | z→X | z→b | z→c | ... | z→c |
| | | B→X | B→T | B→C | ... | B→Z |
| | | C→L | C→F | C→D | ... | C→X |
| | | D→J | D→L | D→X | ... | D→W |
| | | ... | ... | ... | ... | ... |
| Digit | | X→N | X→B | X→Z | ... | X→C |
| | | Z→W | Z→M | Z→F | ... | Z→D |
| | | 0→6 | 0→3 | 0→4 | ... | 0→2 |
| | | 1→8 | 1→2 | 1→6 | ... | 1→3 |
| | | 2→3 | 2→9 | 2→1 | ... | 2→9 |
| | | ... | ... | ... | ... | ... |
| | | 9→2 | 9→1 | 9→5 | ... | 9→0 |

TECHNIQUES FOR PROTECTING ELECTRONIC DATA

CROSS-REFERENCE TO RELATED APPLICATION(S)

This patent application claims the benefit of U.S. Provisional Application No. 62/344,724, filed Jun. 2, 2016, which is incorporated herein by reference in its entirety.

FIELD OF THE INVENTION

Embodiments of the present invention disclosed herein relate generally to the fields of electronic databases and data security. More particularly, the present invention relates to improved techniques for protecting electronic data, such as sensitive data transmitted among client devices, servers, and databases over a communications network, especially in the context of cloud computing.

BACKGROUND OF THE INVENTION

Organizations, especially large enterprises, have been making significant, ongoing investments and efforts in preventing sensitive data from being leaked or stolen in order to fulfill the responsibility and requirement of protecting customer and internal data. For example, companies who receive any personally identifiable information (PII), are obligated to safeguard such information pursuant to privacy laws and/or consumer protection laws. At the same time, there is often a need to extract live or production data into a non-production environment, such as UAT (User Acceptance Test) or SIT (System Integration Test), in order to perform meaningful testing on the application or system being developed. In general, sensitive data need to be passed among different parts of an organization's IT infrastructure where the transmission paths are not always fully secured.

The types of data to be extracted and/or tested often come with different structures, formats, and constraints, and such electronic data typically come from a wide range of sources such as relational databases, data warehouses, big data platforms, as well as unstructured or semi-structured data files. Often, there is no simple way to securely and consistently mask sensitive data along the data path within and between applications and systems. While sensitive data has to be masked securely, there are other requirements on the output of the masked data. For example, the format of the masked data should be preserved, referential integrity of records should be maintained, and data validation rules should not be violated. On the other hand, it is often desirable to also support multilingual masking for multi-byte characters (e.g., Chinese and Japanese characters). These are some examples of requirements that often must be fulfilled at the same time in order to generate meaningful test results based on data coming from multiple upstream sources at multiple intervals. The same also applies to output data that might be consumed by downstream applications or systems.

In prior data-masking approaches, separate masking algorithms are often applied individually on a field by field basis, and a set of different masking rules have to be defined for each masking pass in order to mask data securely and at the same time maintain relationship among data elements. As a result, the process has been tedious, inefficient, and error prone, which often leads to unintended data leakage.

Furthermore, prior tokenization-based data protection approaches tend to use large token databases which impose significant overhead upon the underlying systems and/or applications. Typically, those prior solutions are costly to implement, not scalable or cloud-native, and also unable to support multiple types of applications at the same times.

In light of the various deficiencies and problems with existing data protection methods, there is a need for improved techniques that could securely and reliably protect sensitive data in a more efficient manner.

BRIEF DESCRIPTION OF THE DRAWINGS

The accompanying drawings, which are included to provide a further understanding of the invention and are incorporated in and constitute part of this specification, illustrate several embodiments of the invention and, together with the description, serve to explain the principles of the invention. The purpose and advantages of the present invention will be apparent to those of skill in the art from the following detailed description in conjunction with the appended drawings.

FIG. 6 shows a portion of an exemplary token map for data protection in accordance with one embodiment of the present invention.

DETAILED DESCRIPTION OF THE INVENTION

Some embodiments of the present invention set forth a set of data-masking techniques know as DREAMS (Data Requisition, Extraction, Automated Masking Service) which provides a data protection solution for data extraction, masking, and transfer from production data sources to a non-production environment, for example. With these data-masking techniques, sensitive data can be masked using a "DREAMS Data Masking Engine" before leaving production environment with the purpose of preventing data leakage.

The DREAMS Data Masking Engine may apply a standard masking ruleset for the majority of sensitive data including personal information.

According to embodiments of the present invention, the DREAMS Data Masking Engine may read data from heterogeneous sources defined by users via parallel processing with concurrent threads, and may apply a consistent set of masking rules to perform data transformation on some or all sensitive data fields, thereby producing masked data output that preferably fulfills one or more of the following six properties:

Irreversibility: The masked data is irreversible, and it is impossible to re-produce, or calculate the original data based on the masked data, with or without the knowledge of the masking algorithms applied.

Secure randomness: The masked data is secure and random, through the use of secure API. The same value will be transformed to different random values in a different masking pass.

Pattern preservation: The masked data preserves the format of the source data, which ensures the compliance of application specific format validation rules.

Key uniqueness: The masked data ensures the uniqueness of all key fields, ensuring no duplication in any key or identifier that must be used to uniquely identify a record or data element.

Referential integrity: The masked data maintains referential integrity of all records, and the value of a foreign key will be transformed to the same value of the corresponding primary key. Data relationship will be maintained in all persistence types that are masked in the same pass.

Multilingual/multi-byte representation: The masked data resumes the same natural language as the source data, when the original character encoding scheme is applied.

The masked output can be written to heterogeneous data destinations that mirror the input sources or have different output persistence types.

In order to achieve the above-described criteria, the DREAMS Data Masking Engine may selectively apply a "secure masking" procedure or a "deterministic masking" procedure in the data transformation stage.

Secure Masking

Figure 1:
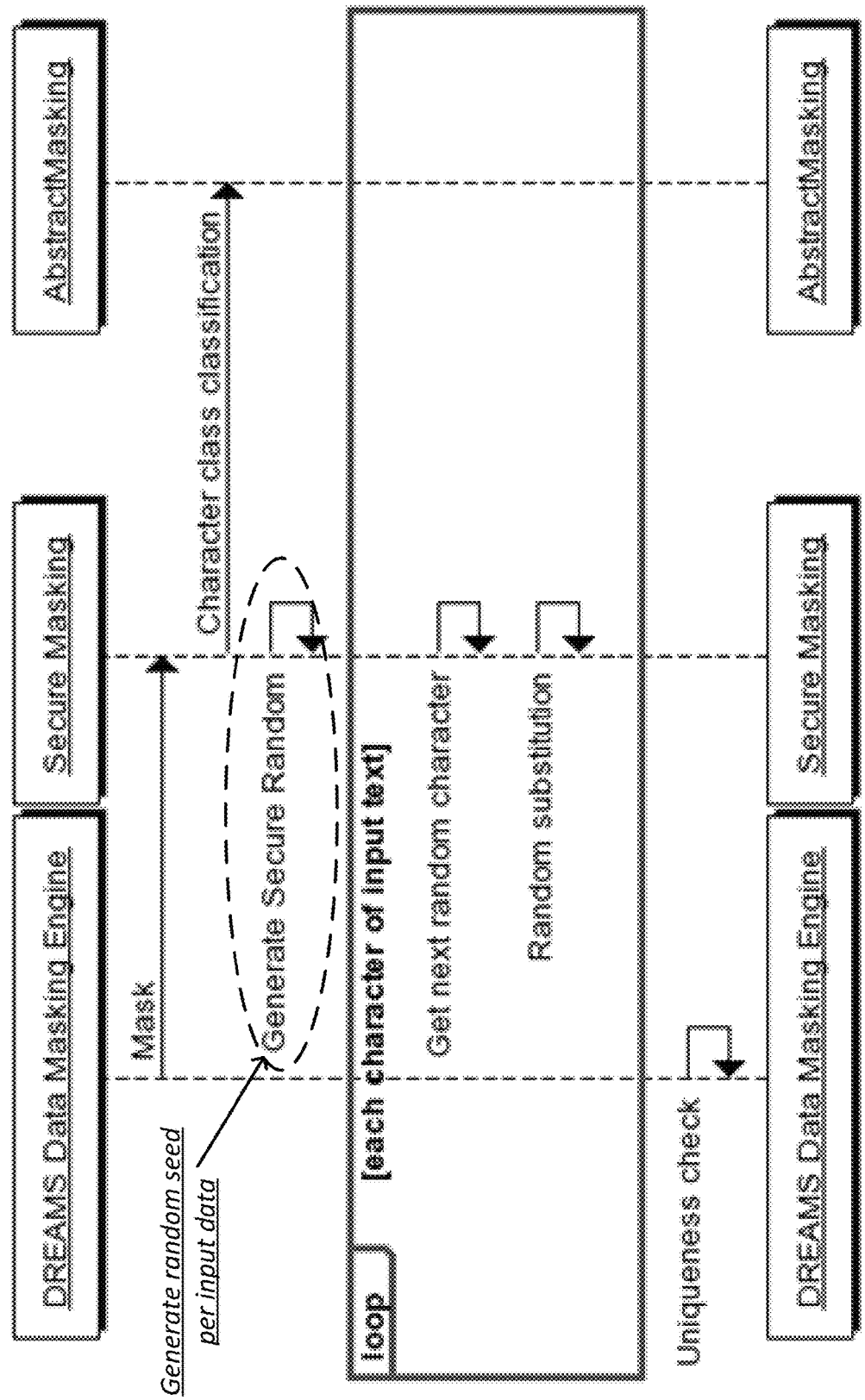
FIG. 1 is a block diagram illustrating an exemplary data masking procedure (Secure Masking) in accordance with one embodiment of the present invention.

FIG. 1 shows a block diagram illustrating an exemplary data masking procedure (Secure Masking) in accordance with one embodiment of the present invention.

In the secure masking procedure, for each masking pass, the characters in the source data stream may be classified into (1) English vowels, (2) English consonants, (3) digits, (4) non-English characters, and (5) symbols, and then placed into different processing queues in memory.

A sequence of valid characters for each character class (except the symbol class) may be created, and for each character class, a random substitution is performed to replace every character in the source data. A SecureRandom object may be created for each input stream using the Java "SecureRandom" API, and the substituting character is picked by a random position, generated by the SecureRandom, in the corresponding valid character sequence. For instance, non-English characters may be treated as hexadecimal values and the position of the substituting character, within the valid hexadecimal range, may be picked with a random shift value. Special characters or symbols carry no sensitive meaning and will not be randomized in order to preserve the data format.

The masked data is returned in the output stream. The entire masking process can execute in memory without any data preserved to permanent storage.

A uniqueness check may be performed on the masked data to screen out any possible duplication. The masking process can be re-executed if there is any duplication.

Deterministic Masking

Figure 2:
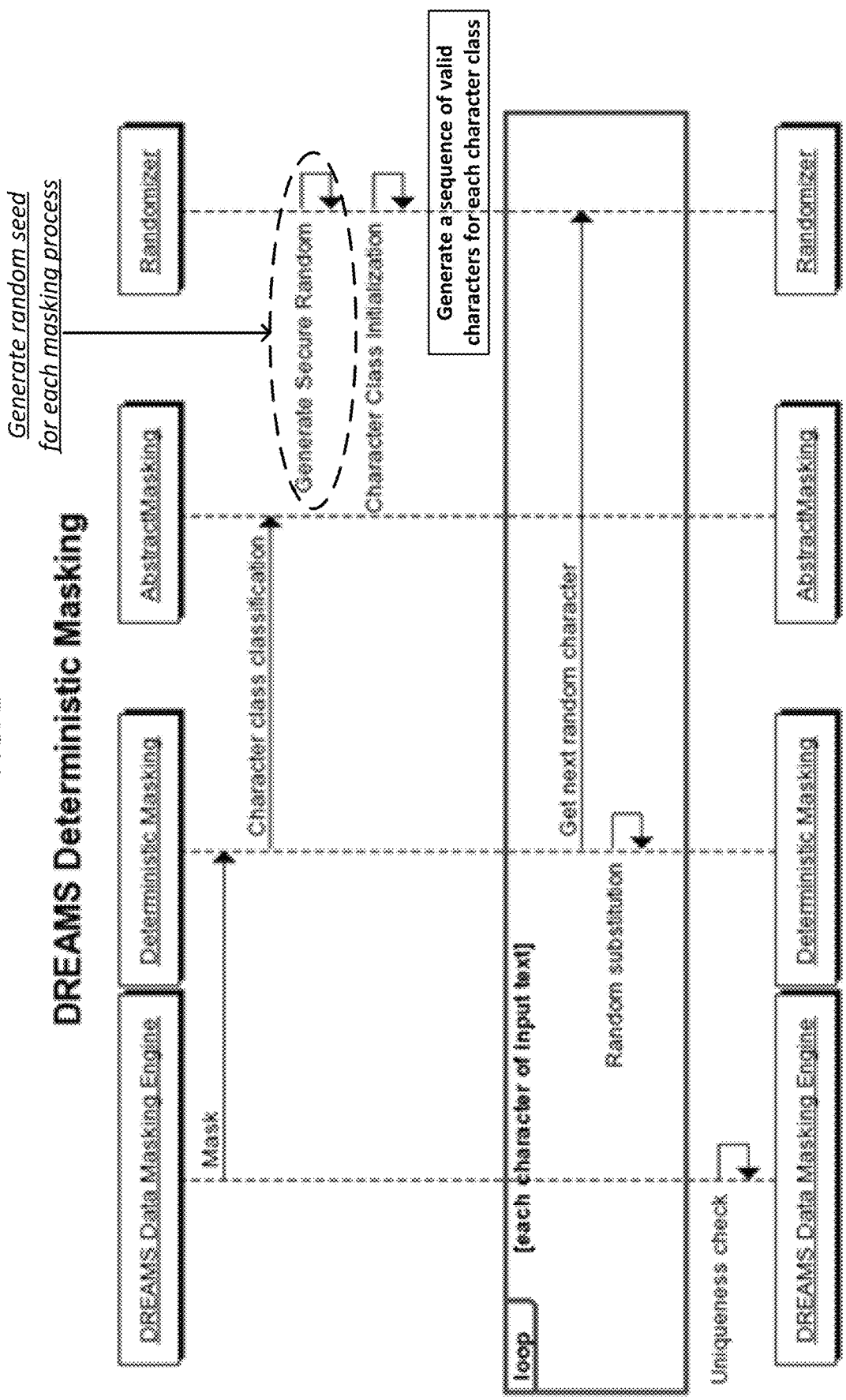
FIG. 2 is a block diagram illustrating an exemplary data masking procedure (Deterministic Masking) in accordance with one embodiment of the present invention.

FIG. 2 shows a block diagram illustrating an exemplary data masking procedure (Deterministic Masking) in accordance with one embodiment of the present invention.

In the deterministic masking procedure, for each masking pass, a SecureRandom object may be generated using the Java "SecureRandom" API. If there are multiple data sources in the same masking pass, the same SecureRandom may be used for all sources with the same or different source types (e.g., database, text files, etc.). This is in contrast to the above-described secure masking procedure where a random seed is generated for each input data or input stream; here, for the deterministic masking procedure, a random seed is generated for each masking process.

The characters in the source data stream may be classified into (1) English vowels, (2) English consonants, (3) digits, (4) non-English characters, and (5) symbols, and then placed into different processing queues in memory.

A sequence of valid characters for each character class (except the symbol class) may be created, and for each character class, a random substitution is performed to replace every character in the source data. The substituting character is picked by a random position, generated by the SecureRandom, in the corresponding valid character sequence. For instance, non-English characters may be treated as hexadecimal values and the position of the substituting character, within the valid hexadecimal range, will be picked with a random shift value. Special characters or symbols carry no sensitive meaning, and will not be randomized in order to preserve the data format.

The masked data is returned in the output stream. The entire masking process can execute in memory without any data preserved to permanent storage.

A uniqueness check will be performed on the masked data to screen out any possible duplication. The masking process will be re-executed if there is any duplication.

An Example of Data Masking

Figure 3:
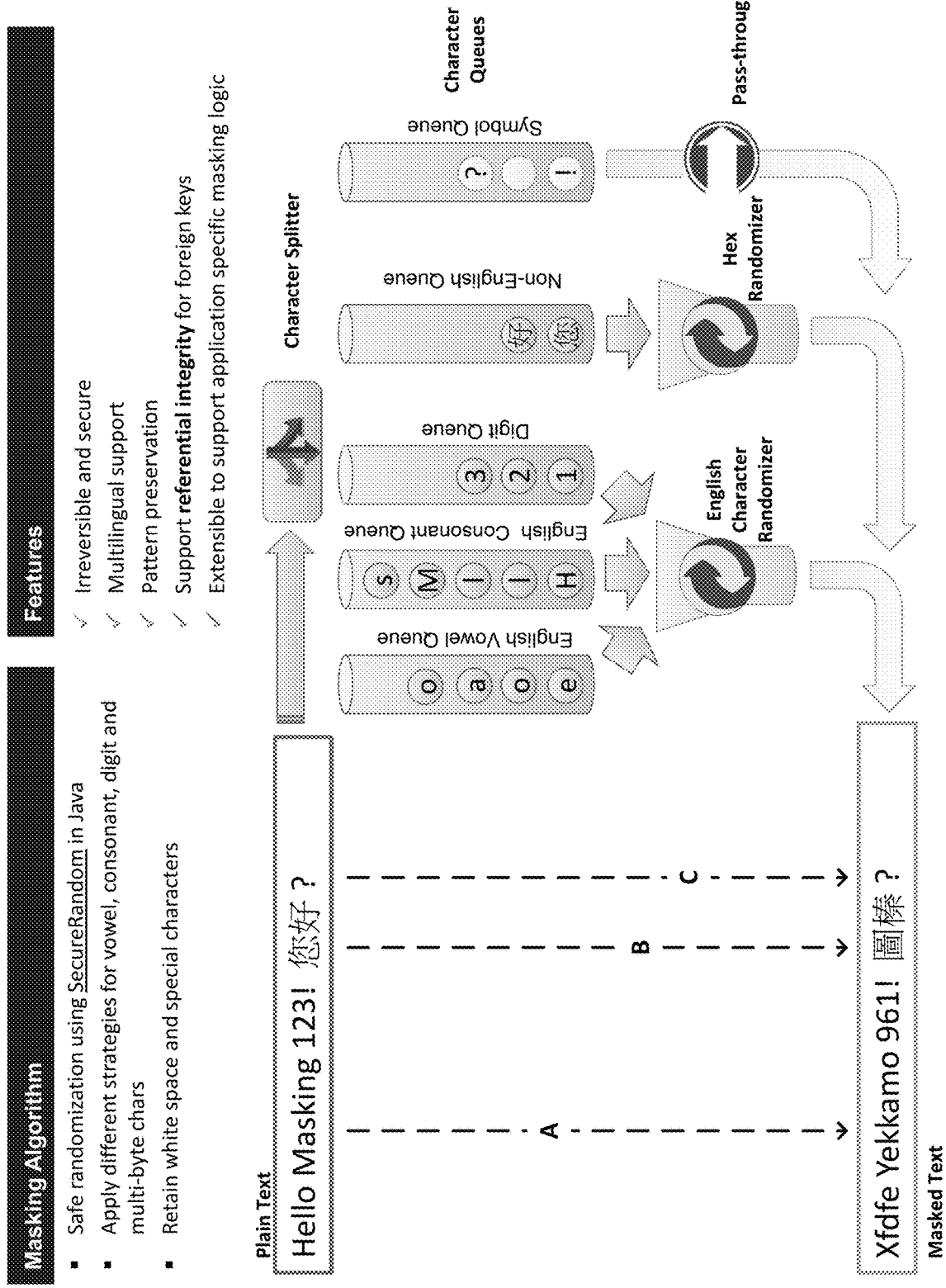
FIG. 3 is a block diagram illustrating an exemplary data masking algorithm with an example in accordance with one embodiment of the present invention.

FIG. 3 shows a block diagram illustrating an exemplary data masking algorithm with an example in accordance with one embodiment of the present invention.

As shown, an original piece of plain text "Hello Masking 123! 您好 ?" may require masking based on either of the above-described procedures.

First, the plain text string may be fed to a character splitter that parses the characters into categories such as (1) English vowels, (2) English consonants, (3) numerical digits, (4) non-English characters, and (5) symbols. Corresponding memory queues may be set up to store the respective categories of sorted characters.

Next, characters belonging to Categories (or Queues) (1)-(3) may be inputted to an English character randomizer so that each character can be replaced with a random character in the same category. In this example, the string of English letters and numbers "Hello Masking 123" is replaced with "Xfdfe Yekkamo 961" (as indicated by dash line A in FIG. 3).

Similarly, the characters in the non-English queue may be inputted to a hex randomizer so that each character may be replaced with a random one in the same category. In this example, two randomly selected Chinese characters "圖燊" takes the place of the two original Chinese characters "您好" (as indicated by dash line B in FIG. 3).

As to symbols, such as space and punctuation marks (e.g., "!" and "?"), those characters are passed through into the string of masked text without any change (as indicated by dash line C in FIG. 3).

As a result, the original string of plain text "Hello Masking 123! 您好 ?" is transformed into the string of masked text "Xfdfe Yekkamo 961! 圖榛 ?" which securely and randomly masks the original data.

Data Masking for Tokenization Service

According to other embodiments of the present invention, additional data protection techniques may be implemented based on the above-described data masking methods. With these embodiments, data security may be improved with an efficient and scalable tokenization service based on in-memory two-way conversions of electronic data using a small token map. For example, rather than the one-way, irreversible conversion of sensitive data in the data masking operations described above, the conversion of characters (and/or symbols) may be applied to the tokenization and de-tokenization/redemption processes such that sensitive data may be transmitted securely in a tokenized form and, when needed, restored to the original form reliably and efficiently.

Figure 5:
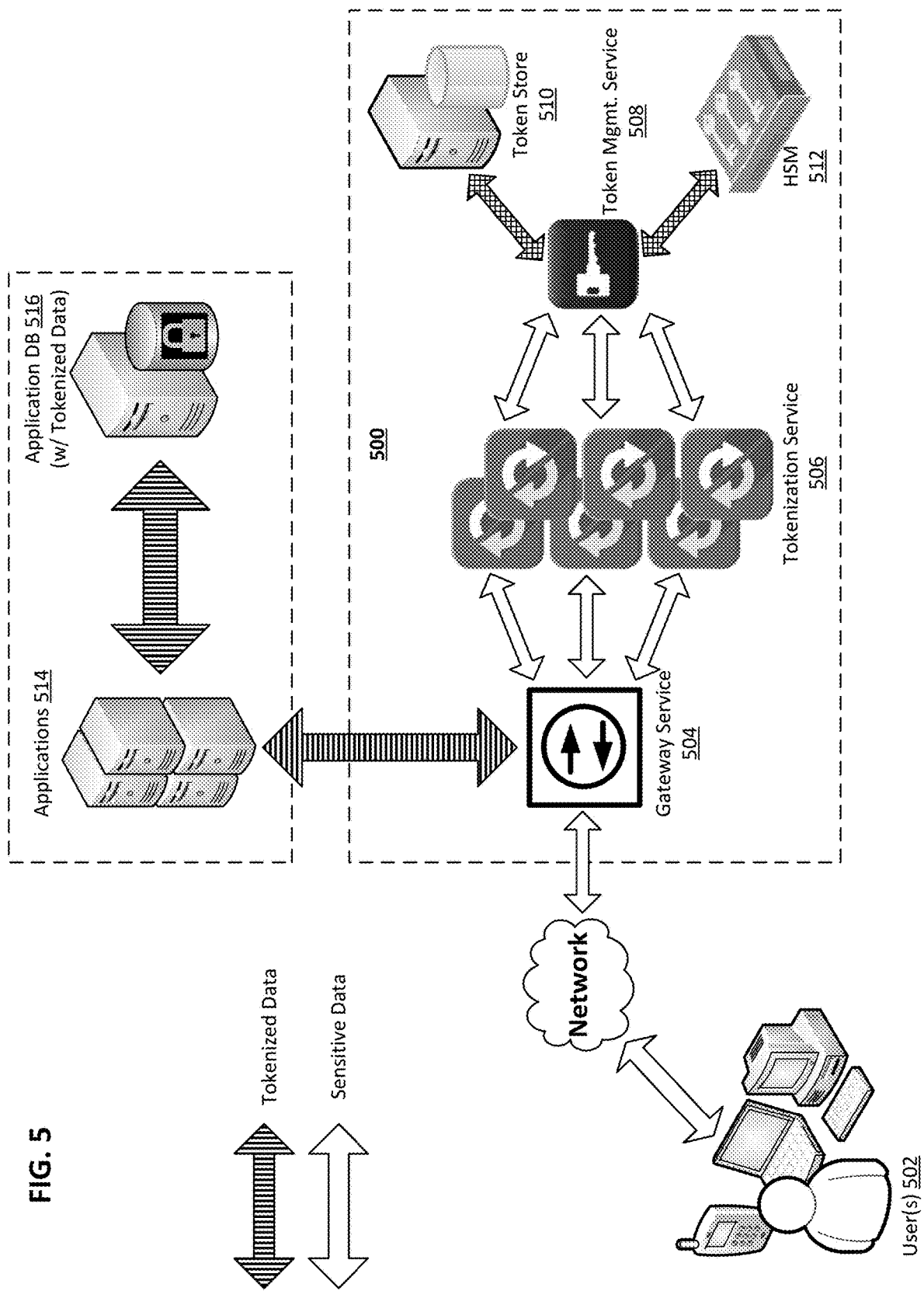
FIG. 5 shows a block diagram illustrating an exemplary system for tokenization-based data protection in accordance with one embodiment of the present invention.

FIG. 5 shows a block diagram illustrating an exemplary system for tokenization-based data protection in accordance with one embodiment of the present invention.

At least one user 502 may employ one or more computing devices, such as a smart phone, a desktop or laptop computer, to access cloud-hosted data and/or services via a communication network (e.g., Internet). The cloud-hosted resources may be provided by a public cloud platform including at least an application server 514 coupled to an application database 516. Since the electronic data passed between the computing device(s) of user(s) 502 and the public cloud platform may be or contain sensitive or confidential information, it may be desirable to protect the data so that they are indecipherable (and therefore useless) to hackers and/or other unauthorized recipients.

Thus, according to one embodiment of the invention, computing and communications components may be interposed between user(s) 502 and the public cloud to tokenize the sensitive data before submission to the application server 514. As shown in FIG. 5, a Gateway Service module 504 may receive the incoming data stream from the user device(s) and route the data to a Tokenization Service module 506. Working with a Token Store 510 and a Hardware Security Module (HSM) 512 through Token Management Service 508, the Tokenization Service module 506 converts the sensitive data into tokens. The HSM 512 may safeguard and manage digital keys for strong authentication and be dedicated to cryptoprocessing. The Token Store 510 is a database for storing token maps (or tokenization keys). The Token Management Service 508 may be the web services that handles requests of key generation and encrypts a key with HSM 512 before storing it in the Token Store 510. The tokenized data are transmitted via the Gateway Service 504 to the public cloud where both the application server 514 and the application database 516 handle the otherwise sensitive data only in their tokenized form.

Conversely, the data returned from the public cloud to the user(s) 502 may be de-tokenized by the Tokenization Service 506 before being forwarded to the user device(s) via the Gateway Service 504.

In order that any tokenized data can be correctly handled by the public cloud just like the original data, the Tokenization Service 506 may convert the original data in substantially the same manner as the data masking operations described above which preserve data format and/or referential integrity. A small in-memory token map (or character maps) may be used to tokenize the original data and subsequently de-tokenize the tokenized data.

For example, much like the data masking operations described above, the Tokenization Service 506 may receive an incoming stream of electronic data from the user(s) 502 via the Gateway Service 504. The incoming data may be classified and split into multiple character queues—such as (1) English vowels, (2) English consonants, (3) digits, (4) non-English characters, and (5) symbols—and then placed into different processing queues in memory. Next, characters in each of these character queues may be replaced by other characters in the same category which are chosen based on a token map. (According to some embodiments, it may be unnecessary to replace the symbols.) With the resulting character queues, a tokenized stream of data may be re-assembled which includes the replacement characters but preserves the format (including sequence) of the incoming stream.

The token map is preferably generated on the fly to create an unpredictable random mapping between the original characters and replacement characters. According to embodiments of the present invention, the token map may be different and unique for different users, applications, and/or data types. Typically, it may be each application's responsibility to manage user entitlement and to ensure each user's data are de-tokenized based on that user's own token map or keys. According to some embodiments of the present invention, the token map may change over time, and the system may enforce a time-out or periodic expiration of a token map whereupon the token map must be regenerated. According to one embodiment, the Tokenization Service 506 may read metadata from the Token Store 510 via the Token Management Service 508 and then perform tokenization or de-tokenization based on the metadata which identify the correct token map to use.

According to embodiments of the present invention, the tokenization service as exemplarily illustrated in FIG. 5 may be of a stateless and fully cloud-native design, such that it could be scale up or down based on demand and workload. In the Gateway Service 504, a flexible rule-based design may be implemented for routing different kinds of tokenization requests where the rule engine is highly re-configurable. According to one embodiment, both the Gateway Service 504 and Tokenization Service 506 may employ a cloud-native microservices architecture that supports horizontal scaling.

FIG. 6 shows a portion of an exemplary token map (600) for data protection in accordance with one embodiment of the present invention.

As shown, the rows of the exemplary token map 600 are grouped into "Vowel/Lower" (lower-case vowels), "Vowel/Upper" (upper-case vowels), "Consonant/Lower" (lower-case consonants), "Consonant/Upper" (upper-case consonants), and "Digit" (numerical digits). Although not shown here, additional categories may include non-English characters such as Chinese, Korean, and/or Japanese characters.

The columns of the exemplary token map 600 correspond to character positions within a line (or other unit) of data. That is, depending on where a character appears in a line (or other unit) of the original data, a different replacement character may be used to substitute that character. For example, as shown in the row indicated by the dashed-line arrow, if the letter "A" appears in the first character position of an original data line, it will be substituted with letter "O"; if the letter "A" appears in the second character position of an original data line, it will be substituted with letter "U"; if the letter "A" appears in the third character position of an original data line, it will be substituted with letter "Y"; and if the letter "A" appears in the last character position of an original data line, it will be substituted with letter "I." The same goes for other vowels, consonants, and numerical digits etc.

In operation, such a relatively small token map may be loaded completely within a random access memory (RAM), and replacement characters can be quickly looked up for substitution of original characters in the various character queues (also in the RAM) to generate tokenized data. The token map may be similarly looked up to convert tokenized data into non-tokenized data.

The token map based data protection method is both fast and secure because it relies on the small in-memory token map as a character look-up table (which may be created on the fly) rather than complex algorithmic calculations. For example, according to one embodiment, the computational overhead associated with each tokenization request may be only 80 milliseconds. Furthermore, the size of the token map can remain constant and the tokenization process can be implemented in a cloud-native manner, making the data protection scheme scalable for various computing environments. The tokenization process can also provide multilingual support and preserve data format.

Compared to existing cloud computing security solutions, the data-protection method according to embodiments of the present invention is more efficient, versatile, and scalable yet less costly.

Computer Implementation

Figure 4:
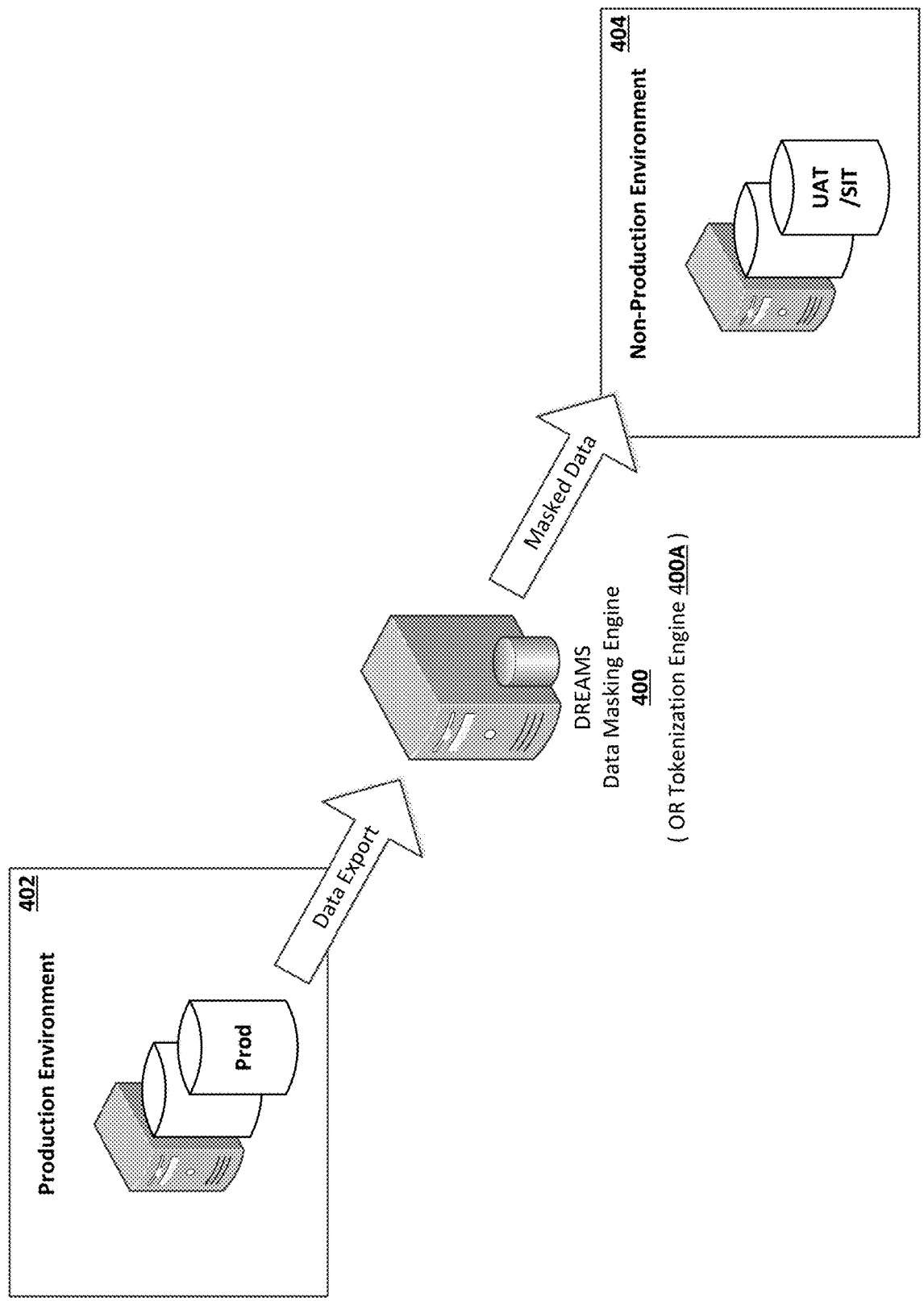
FIG. 4 shows a block diagram illustrating an exemplary system for data masking in accordance with one embodiment of the present invention.

As shown in FIG. 4, the components used to implement embodiments of the present invention may be or include a computer or multiple computers. The components may be described in the general context of computer-executable instructions, such as program modules, being executed by a computer. Generally, program modules include routines, programs, objects, components, data structures, etc. that performs particular tasks or implement particular abstract data types.

Those skilled in the art will appreciate that embodiments of the present invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or non-volatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. A plurality of software processing modules may be stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/non-volatile computer storage media. For example, a hard disk drive may read or write to non-removable, non-volatile magnetic media. A magnetic disk drive may read from or writes to a removable, non-volatile magnetic disk, and an optical disk drive may read from or write to a removable, non-volatile optical disk such as a CD ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed microprocessor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown or described here, those of ordinary skill in the art will appreciate that such components and the interconnections are well known. Accordingly, additional details concerning the internal construction of the computer need not be disclosed in connection with the present invention.

In operation, a computer processor or the like in a computer or server system may be configured with a special set of program instructions to automatically perform data masking and/or data protection functions consistent with the methodology described above.

More particularly, a DREAMS Data Masking Engine 400, which may be a dedicated computer with its own storage device and communication interfaces, may be deployed between a Production Environment 402 and a Non-Production Environment 404. The DREAMS Data Masking Engine 400 effectively intercepts any data export from the Production Environment 402 and determines whether any data masking should be applied to the exported data. For sensitive data requiring masking, the DREAMS Data Masking Engine 400 may apply one or more masking algorithms (e.g., the Secure Masking or Deterministic Masking as described above) to the exported data and then output the masked data stream to the Non-Production Environment 404.

Similarly, a Tokenization Engine 400A may be implemented in place of the DREAMS Data Masking Engine 400 to receive an input stream of electronic data and tokenize or de-tokenize the data based on the methodology described above.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the patent claims ultimately issued from this application.

The invention claimed is:

1. A computer-implemented method for protecting sensitive data, the method comprising:
   receiving, via a first communication interface, a first input stream of electronic data from a client device, said first input stream of electronic data having a first predetermined sequence and being destined for a server;
   tokenizing said first input stream of electronic data by:
      splitting said first input stream of electronic data into multiple categories including at least alphanumerical characters, non-English characters, and symbols,
      first substituting each character in the alphanumerical characters category with an alphanumerical character selected based on a first token map, thereby generating at least one protected alphanumerical character set,
      second substituting each character in the non-English characters category with a non-English character selected based on a second token map different from the first token map, thereby generating at least one protected non-English character set, and
      re-assembling a first output stream of tokenized electronic data based at least in part on said at least one protected alphanumerical character set and said at least one protected non-English character set while preserving said first predetermined sequence; and
   transmitting, via a second communication interface, said first output stream of tokenized electronic data to said server, wherein first token maps are dynamically and randomly generated for the each character of the alphanumerical characters category included in the first input stream of electronic data such that a same first token map is not utilized in a subsequent tokenization of an alphanumerical character, and wherein second token maps are dynamically and randomly generated for the each character of the non-English characters category included in the first input stream of electronic data such that a same second token map is not utilized in a subsequent tokenization of a non-English character.

2. The method of claim 1, further comprising:

receiving, via the second communication interface, a second input stream of tokenized electronic data from said server, said second input stream of tokenized electronic data having a second predetermined sequence and being destined for said client device;

de-tokenizing said second input stream of tokenized electronic data based on at least one of the first token map and the second token map, thereby generating a second output stream of de-tokenized electronic data while preserving said second predetermined sequence; and transmitting, via the first communication interface, said second output stream of de-tokenized electronic data to said client device.

3. The method of claim 1, further comprising:

splitting said first input stream of electronic data into character queues corresponding to said multiple categories.

4. The method of claim 3, wherein said character queues corresponding to the multiple categories are placed into respective processing queues in a computer memory before the first substituting and the second substituting.

5. The method of claim 1, further comprising:

splitting said first input stream of electronic data into the following character queues: (1) English vowels, (2) English consonants, (3) digits, (4) non-English characters, and (5) symbols.

6. The method of claim 1, wherein any symbol in said electronic data of said first input stream remains unchanged in said first output stream of tokenized electronic data.

7. The method of claim 1, wherein, in at least one of the first substituting and the second substituting, substitution characters are selected from at least one of the first token map and the second token map based on a position of a character within a unit of said electronic data of said first input stream.

8. The method of claim 1, further comprising:

generating at least a portion of at least one of the first token map and the second token map at or near the time of receiving said first input stream of electronic data.

9. The method of claim 1, further comprising:

storing at least one of the first token map and the second token map in a token store.

10. The method of claim 1, further comprising:

retrieving at least one of the first token map and the second token map from a token store.

11. A computer-implemented system for protecting sensitive data, the system comprising:

a gateway device interposed between a client device and a server, the gateway device having a first communication interface with said client device and a second communication interface with said server;

a tokenization device having at least one computer processor coupled to said gateway device and a storage medium, the tokenization device being configured to:

receive, via said first communication interface, a first input stream of electronic data from said client device, said first input stream of electronic data having a first predetermined sequence and being destined for said server;

tokenize said first input stream of electronic data by:

splitting said first input stream of electronic data into multiple categories including at least alphanumerical characters, non-English characters, and symbols, first substituting each character in the alphanumerical characters category with an alphanumerical character selected based on a first token map, thereby generating at least one protected alphanumerical character set, second substituting each character in the non-English characters category with a non-English character selected based on a second token map different from the first token map, thereby generating at least one protected non-English character set, and re-assembling a first output stream of tokenized electronic data based at least in part on said at least one protected alphanumerical character set and said at least one protected non-English character set while preserving said first predetermined sequence; and transmit, via said second communication interface, said first output stream of tokenized electronic data to said server, wherein first token maps are dynamically and randomly generated for the each character of the alphanumerical characters category included in the first input stream of electronic data such that a same first token map is not utilized in a subsequent tokenization of an alphanumerical character, and wherein second token maps are dynamically and randomly generated for the each character of the non-English characters category included in the first input stream of electronic data such that a same second token map is not utilized in a subsequent tokenization of a non-English character.

12. The system of claim 11, wherein the tokenization device is further configured to:

receive, via said second communication interface, a second input stream of tokenized electronic data from said server, said second input stream of tokenized electronic data having a second predetermined sequence and being destined for said client device;

de-tokenize said second input stream of tokenized electronic data based on the token map, thereby generating a second output stream of de-tokenized electronic data while preserving said second predetermined sequence; and transmit, via said first communication interface, said second output stream of de-tokenized electronic data to said client device.

13. The system of claim 11, wherein the tokenization device is further configured to:

split said first input stream of electronic data into character queues corresponding to said multiple categories.

14. The system of claim 13, wherein said character queues corresponding to the multiple categories are placed into respective processing queues in a computer memory before the first substituting and the second substituting.

15. The system of claim 11, wherein the tokenization device is further configured to:

split said first input stream of electronic data into the following character queues: (1) English vowels, (2) English consonants, (3) digits, (4) non-English characters, and (5) symbols.

16. A non-transitory computer-readable medium having code for protecting sensitive data, the computer-readable medium comprising processor instructions configured to cause a processor to perform:
receiving, via a first communication interface, a first input stream of electronic data from a client device, said first input stream of electronic data having a first predetermined sequence and being destined for a server;
tokenizing said first input stream of electronic data by:
splitting said first input stream of electronic data into character queues corresponding to multiple categories including at least alphanumerical characters, non-English characters, and symbols,
first substituting each character in the alphanumerical characters queue with an alphanumerical character selected based on a first token map, thereby generating at least one protected alphanumerical character queue,
second substituting each character in the non-English characters queue with a non-English character selected based on a second token map different from the first token map, thereby generating at least one protected non-English character queue, and
re-assembling a first output stream of tokenized electronic data based at least in part on said at least one protected alphanumerical character queue and said at least one protected non-English character queue while preserving said first predetermined sequence; and
transmitting, via a second communication interface, said first output stream of tokenized electronic data to said server,
wherein first token maps are dynamically and randomly generated for the each character of the alphanumerical characters category included in the first input stream of electronic data such that a same first token map is not utilized in a subsequent tokenization of an alphanumerical character, and
wherein second token maps are dynamically and randomly generated for the each character of the non-English characters category included in the first input stream of electronic data such that a same second token map is not utilized in a subsequent tokenization of a non-English character.

17. The non-transitory computer-readable medium of claim 16, further comprising processor instructions for:
receiving, via the second communication interface, a second input stream of tokenized electronic data from said server, said second input stream of tokenized electronic data having a second predetermined sequence and being destined for said client device;
de-tokenizing said second input stream of tokenized electronic data based on at least one of the first token map and the second token map, thereby generating a second output stream of de-tokenized electronic data while preserving said second predetermined sequence; and
transmitting, via the first communication interface, said second output stream of detokenized electronic data to said client device.

18. The non-transitory computer-readable medium of claim 16, further comprising processor instructions for:
splitting said first input stream of electronic data into character queues corresponding to said multiple categories.

19. The non-transitory computer-readable medium of claim 18, wherein said character queues corresponding to the multiple categories are placed into respective processing queues in a computer memory before the first substituting and the second substituting.

20. The non-transitory computer-readable medium of claim 16, further comprising processor instructions for:
splitting said first input stream of electronic data into the following character queues: (1) English vowels, (2) English consonants, (3) digits, (4) non-English characters, and (5) symbols.

* * * * *